United States Patent
Harrison

(10) Patent No.: US 11,138,261 B2
(45) Date of Patent: Oct. 5, 2021

(54) MEDIA PLAYABLE WITH SELECTABLE PERFORMERS

(71) Applicant: Donald Harrison, New Orleans, LA (US)

(72) Inventor: Donald Harrison, New Orleans, LA (US)

(73) Assignee: DONALD HARRISON JR. ENTERPRISES, HARRISON EXTENSIONS, AND MARY AND VICTORIA INC., New Orleans, LA (US)

( * ) Notice: Subject to any disclaimer, the term of this patent is extended or adjusted under 35 U.S.C. 154(b) by 671 days.

(21) Appl. No.: 14/797,215

(22) Filed: Jul. 13, 2015

(65) Prior Publication Data

US 2015/0317391 A1     Nov. 5, 2015

Related U.S. Application Data

(63) Continuation-in-part of application No. 12/137,061, filed on Jun. 11, 2008, now abandoned.

(60) Provisional application No. 60/950,375, filed on Jul. 18, 2007.

(51) Int. Cl.

| | | |
|---|---|---|
| G10H 1/00 | (2006.01) | |
| G06F 16/638 | (2019.01) | |
| G06F 3/0482 | (2013.01) | |
| G06F 3/0484 | (2013.01) | |
| G11B 27/10 | (2006.01) | |
| G11B 27/034 | (2006.01) | |
| G11B 27/34 | (2006.01) | |
| H04R 3/00 | (2006.01) | |

(52) U.S. Cl.
CPC .......... *G06F 16/639* (2019.01); *G06F 3/0482* (2013.01); *G06F 3/04842* (2013.01); *G10H 1/0025* (2013.01); *G11B 27/034* (2013.01); *G11B 27/105* (2013.01); *G11B 27/34* (2013.01); *G10H 2210/125* (2013.01); *G10H 2240/061* (2013.01); *H04R 3/00* (2013.01); *H04R 2420/01* (2013.01); *H04R 2499/13* (2013.01)

(58) Field of Classification Search
CPC ............. G06F 17/30772; G06F 3/0482; G06F 3/04842
USPC .......................................................... 715/716
See application file for complete search history.

(56) References Cited

U.S. PATENT DOCUMENTS

| | | | | |
|---|---|---|---|---|
| 6,287,124 B1 * | 9/2001 | Yamaura | ................ | G09B 15/00 434/118 |
| 6,408,129 B1 * | 6/2002 | Cookson | .................. | G09B 5/04 348/E5.111 |

(Continued)

FOREIGN PATENT DOCUMENTS

| | | |
|---|---|---|
| JP | 2001-331176 | 11/2001 |
| WO | WO 01/09875 | 2/2001 |
| WO | WO 2005/003927 | 1/2005 |

*Primary Examiner* — Henry Orr

(74) *Attorney, Agent, or Firm* — Nixon & Vanderhye P.C.

(57) ABSTRACT

A media processor and method of customizing a media composition enables a user to compile a customized media file with selectable tracks and a primary track. Each of the selectable tracks includes a recording of a performer performing a part of a particular composition, such as an instrument or vocal part in a musical piece. The user is provided an option to select one or more of the tracks; and a customized media file is prepared based on the user selected tracks and including the primary track.

14 Claims, 5 Drawing Sheets

(56) References Cited

U.S. PATENT DOCUMENTS

| | | | |
|---|---|---|---|
| 7,191,023 B2 | 3/2007 | Williams | |
| 7,343,210 B2 | 3/2008 | DeVito et al. | |
| 7,382,233 B2 | 6/2008 | Steinetz et al. | |
| 7,640,069 B1 | 12/2009 | Johnston | |
| 7,709,723 B2 | 5/2010 | Pachet et al. | |
| 7,772,480 B2 | 8/2010 | Brennan | |
| 2001/0035087 A1 | 11/2001 | Subotnick | |
| 2002/0161571 A1* | 10/2002 | Matsushima | G06F 21/10 704/200 |
| 2002/0172118 A1* | 11/2002 | Yamada | G10H 1/0091 369/53.31 |
| 2003/0125933 A1* | 7/2003 | Saunders | G11B 20/00007 704/201 |
| 2004/0136549 A1* | 7/2004 | Pennock | G10H 1/02 381/119 |
| 2005/0036628 A1* | 2/2005 | Devito | G11B 27/034 381/61 |
| 2008/0010372 A1* | 1/2008 | Khedouri | G06F 17/30094 709/224 |
| 2008/0013757 A1* | 1/2008 | Carrier | G10H 1/0008 381/119 |
| 2009/0022015 A1* | 1/2009 | Harrison | G10H 1/0058 369/1 |
| 2010/0014399 A1* | 1/2010 | Kudo | G10H 1/40 369/47.36 |
| 2010/0305732 A1* | 12/2010 | Serletic | G06F 3/0481 700/94 |
| 2014/0006945 A1* | 1/2014 | Herberger | G06F 3/0484 715/716 |

* cited by examiner

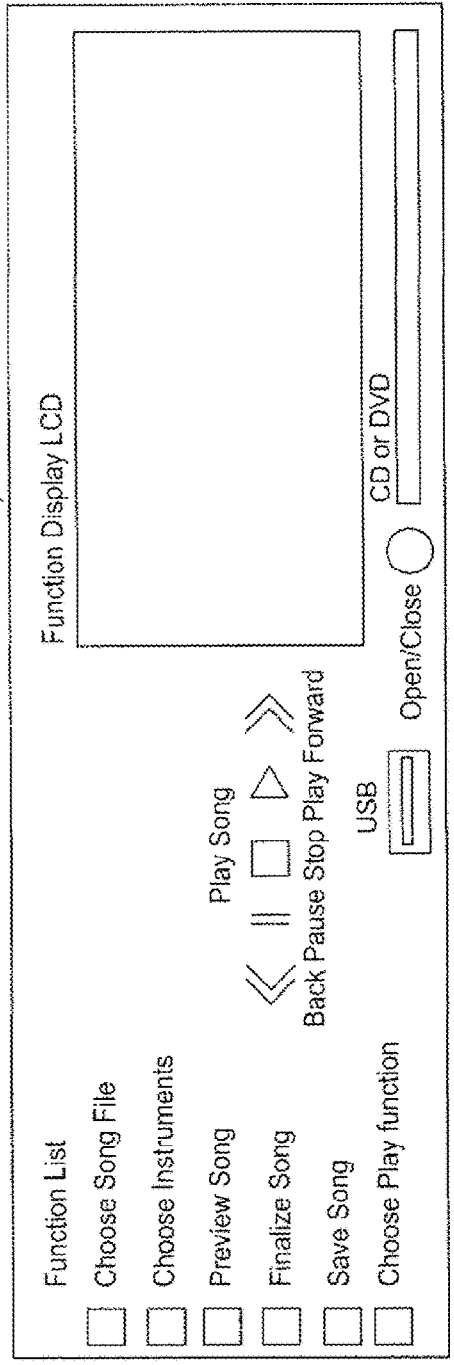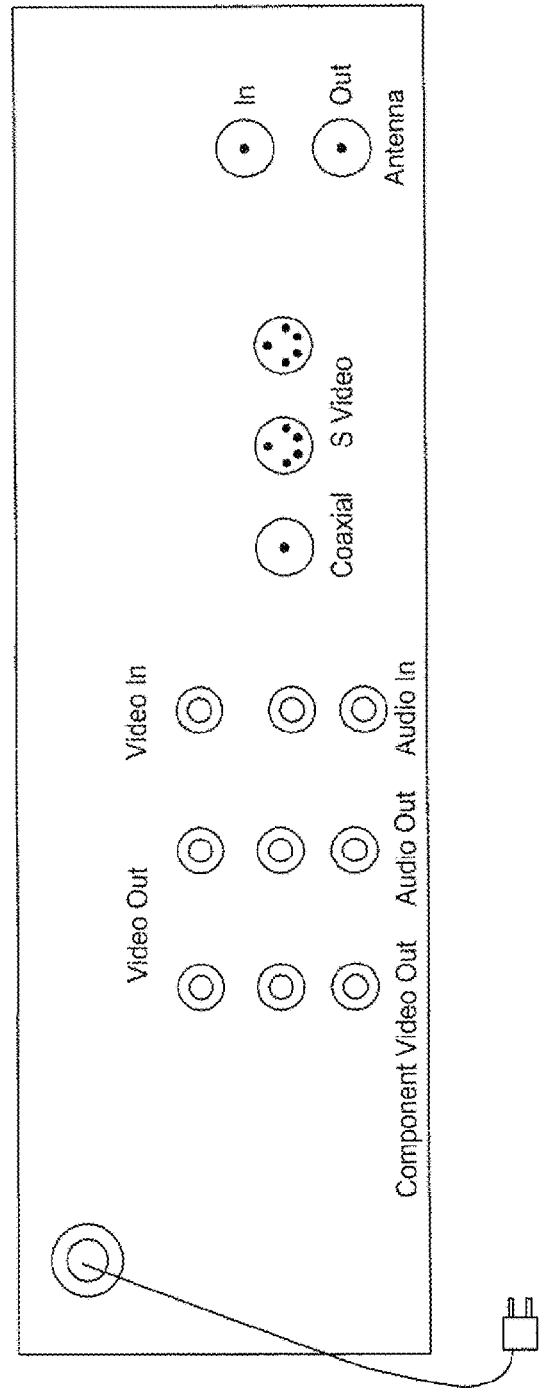
Fig. 3

Track 1: plural vocal performance artist choices

| Christina Agulara | Beyonce | Usher | Elton John | Aretha Franklin |
| time: 3:29 | 3:29 | 3:29 | 3:29 | 3:29 |

Track 2: plural piano performance artist choices

| Herbie Hancock | McCoy Tyner | Dr. John | Elton John | Paul Shafer |
| time: 3:29 | 3:29 | 3:29 | 3:29 | 3:29 |

Track 3: plural didgeridoo performance artist choices

| John Wayne | Lil' Wayne | Kanye West | Kevin Eubanks | Liberace |
| time: 3:29 | 3:29 | 3:29 | 3:29 | 3:29 |

Track 4 artist choices, Track 5 artist choices, Track 6 artist choices etc. . . .

Fig. 4

MEDIA PLAYABLE WITH SELECTABLE PERFORMERS

CROSS-REFERENCES TO RELATED APPLICATIONS

This application is a continuation-in-part (CIP) of U.S. patent application Ser. No. 12/137,061, filed Jun. 11, 2008, pending, which claims the benefit of U.S. Provisional Patent Application No. 60/950,375, filed Jul. 18, 2007, the entire content of each of which is herein incorporated by reference.

STATEMENT REGARDING FEDERALLY SPONSORED RESEARCH OR DEVELOPMENT (Not Applicable)

BACKGROUND OF THE INVENTION

The invention relates to a media processor and software concept that allows a user to interchange various performances of actors, musicians, etc. on the same composition.

Talented musicians and performers may interpret, arrange or perform music in their own style. As such, a particular composition may have a considerably different sound when played by one group of performers as compared to another group of performers. A listener may appreciate varying styles of different vocalists and instrumentalists, and it would be desirable to provide a vehicle for the listener to select specific performers on a particular composition to create a custom performance. Actors similarly may interpret or perform certain scripts, scenes, movies, etc. in their own style, and a particular performance of one actor may have a different result as compared to another actor.

SUMMARY OF THE INVENTION

The concept described herein allows a user to interchange various performances of individuals (i.e., musicians, vocalists, actors, etc.) on the same composition. Although the invention is applicable to any form of media including a performing artist, the description will primarily focus on music. In this context, songs are arranged and recorded so that each instrument has a number of players playing each part in their own unique way. For example, each track is provided with two or more drummers, guitarists, pianists, singers, etc. The user is able to choose between different vocalists and instrumentalists to create a custom performance of the composition.

In use, when the user puts a CD/DVD in the player or selects a digital file to play via a PC or the like, the user is provided with a list of performers and is prompted to make selections. Once all selections have been made, the user selects "play" to hear the music (final mix choice). It is possible in some instances to select two or more performers from the same instrument or two or more singers at the same time.

All of the tracks are preferably in digital format when played together by the system. The user has the ability to make as many file mix choices as each composition will allow. The user's custom final mix choice of the tracks can be available for transfer to other formats such as CD, MP3, etc. The format will also have the ability to add additional performers to all compositions that are not present when the first rendition of a composition is released.

In an alternative embodiment, the system may incorporate up to five primary tracks that form part of each customized composition. For instance, a first primary track may include audio tracks of artist Donald Harrison playing A440 on his alto saxophone and singing A440. These two tracks are mixed into a single first primary track and placed at a decibel level where the first primary track can enhance all music placed around it. The first primary track is then used for every composition in the selectable media system. Using the first primary track provides for a unique sound that could not be replicated by any other music system, e.g., using the sound of Donald Harrison's copyrighted performances. A second primary track is a version of the first primary track inverted to play backwards. A third primary track is a version of the first primary track with the front half inverted and the back half played forward. A fourth primary track is a version of the first primary track with the front half played forward and the second half inverted to play backwards. A fifth primary track will be devised after processing in a section of the program with software in selectable media that has the ability to interpret the style of the composition, then write and record into the composition a music track based off its impression of the first four primary tracks and all the performance tracks after they are synchronized together. The result of the computer software generated track will be placed as the fifth primary track. This method may include a process where the five primary tracks will be synchronized with all of the performance tracks in singularly for each composition to provide balanced musical axis for every composition in an audio or other media format.

The method may also include further audio mixing all of the performances then rendering the five primary tracks and all the performance tracks into a pre-mastering state then mastering all of the performances and the five primary tracks as a composition. If a glass master or outside master is made then it must be put back in the system by a glass manufacturing facility or facility which has the technology for the type of master provided in the mastering process.

In an exemplary embodiment, a method of customizing a media composition includes the steps of (a) providing a media file with selectable tracks, each track including a recording of a performer performing a part of a particular composition; (b) providing a user an option to select one or more of the tracks; (c) providing a media file with up to five primary tracks; and (d) preparing a customized media file including the primary tracks and the user selected tracks.

In another exemplary embodiment, a media processor for customizing a media file includes a processor programmed to carry out a media customization process, and a memory communicating with the processor. The memory stores a media file with selectable tracks, each track including a recording of a performer performing a part of a particular composition. The media file also includes up to five primary tracks. A user interface communicating with the processor enables a user to select one or more of the tracks. The processor is programmed to prepare a customized media file based on the user selected tracks and including the primary tracks.

In still another exemplary embodiment, a method of customizing a media composition includes the steps of (a) recording a plurality of media files for the media composition, the media files including digital media tracks and up to five primary tracks synchronized with one another, each track including a recording of a performer performing a part of a particular composition including a plurality of parts, wherein the selectable tracks include multiple performances of at least one of the plurality of parts by different performers; (b) providing a user an option to select one or more of the digital media tracks; (c) combining the selected tracks with the primary tracks into a customized media file; (d) enabling the user to preview the customized media file, and providing the user with an option to repeat steps (b) and (c); and (e) when prompted by the user, finalizing the customized media file based on the user selected tracks.

BRIEF DESCRIPTION OF THE DRAWINGS

These and other aspects and advantages will be described in detail with reference to the accompanying drawings, in which:

FIG. 3 illustrates an exemplary front panel of a hardware application; and

FIG. 4 shows exemplary track selections available to the user.

DETAILED DESCRIPTION OF THE INVENTION

Figure 1:
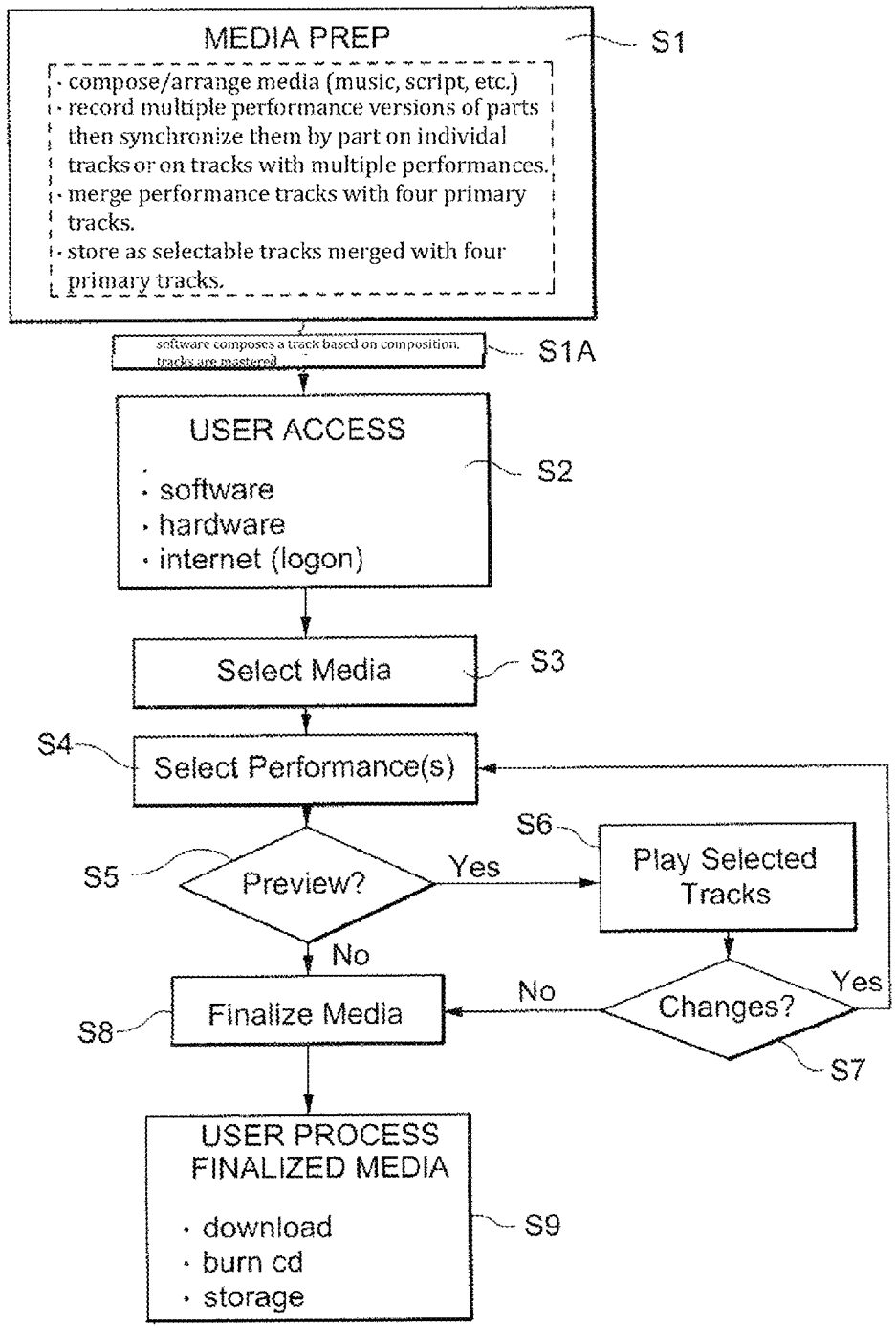
FIGS. 1 and 5 are flowcharts of the customized media processing method.

FIG. 1 is a flowchart illustrating the steps performed by a media processor for customizing a media file according to a preferred embodiment. In preparing the media (step S1), new media may be created, such as the composition of a song, writing a script, etc., or existing media may be arranged for processing by the described system. The arrangement includes separate parts for a plurality of performers. For example, in a music context, a song may include a plurality of parts for a number of instruments as well as one or more vocal parts. Multiple performances of each part, instrument, vocal performance, etc. represented in the arrangement are then recorded in a manner that they can be placed in alignment to all other parts of the arrangement (vertical alignment). That is, performances are recorded in individual tracks that are synchronized with one another. Preferably, each part is recorded in audio isolation with no audio leakage from other tracks. The recorded performances are thus mixed and aligned so that one performance or multiple performances of each part, instrument, vocalist, etc. can be aligned together for multiple choice performance variations.

The tracks are subsequently stored or converted for use by the general public (users). Any suitable format can be used as would be appreciated by those of ordinary skill in the art. The format should be accessible via downloading from the Internet or via uploading from a CD, DVD or other data storage device. The tracks can be stored in a computer, telephone, handheld data storage device such as MP3 players or the like, or any present or future device for the manipulation and processing of data.

In step S2, the user accesses the system via any suitable means. In a computer environment, the user may download software via the Internet or from a CD, DVD or other data storage device for operation by a special purpose computer processor. The software may require an authorized key to allow the user access to a website to download media files such as song files or the like. Alternatively, the media files may be uploaded from a storage device. The manner of downloading and installing software to a user computer is well known, and details of the download/installation process will not be described.

Figure 2:
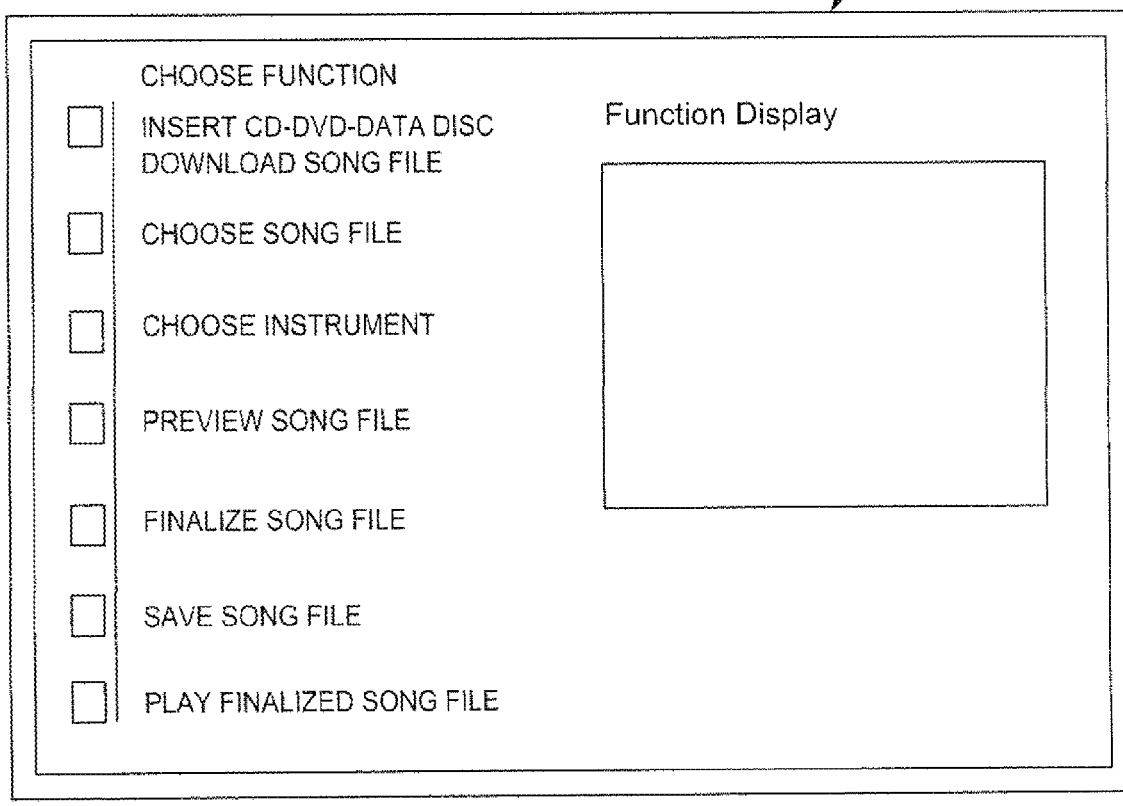
FIG. 2 is an exemplary screen shot in a software or Internet environment.

In a computer environment, with reference to FIG. 2, the system may display the exemplary screen shot 10 showing the customization process. As shown in FIG. 3, similar options may be available for a hardware application 20 including an onboard processor or the like. Alternatively, the hardware 20 may be connected to a computer or other media processor to perform media customization. With continued reference to FIG. 1, in step S3, the user selects the media such as a song to customize. Once selected, the system displays the performances associated with the selected media, and the user is prompted to select one or more performance tracks (step S4). In this context, in the song example, the user can select one instrumental or vocal performance in each category from multiple performances in each instrumental or vocal category list of the song file. As noted above, the user has the option of choosing multiple performances of the same instrument or vocalist in some song files.

Once the performance tracks have been selected, the user is provided with an option to preview the customized file (step S5). If YES, the system plays the selected tracks as a customized media file (step S6), and subsequently, the user is asked whether any changes are desired (step S7). If so, the process returns to step S4, and the user can select additional performances or deselect previously-selected tracks. If the user indicates that no changes are necessary (NO in step S7) or no preview is desired (NO in step S5), the media file is finalized in step S8. Once finalized, the user can process the finalized media in any suitable format for storage on a computer, CD or other storage device, music player, telephone, etc. (step S9).

In an alternative embodiment, the system may incorporate a primary track that forms part of each customized composition. For example, the primary track may include audio tracks of Donald Harrison playing A440 on his alto saxophone and singing A440. These two tracks can be mixed into a single primary track and placed at a decibel level where the primary track can enhance all music placed around it. The primary track is then user for every composition in the selectable media system. Using the primary track provides for a unique sound that could not be replicated by any other music system, e.g., using the sound of Donald Harrison's copyrighted performances.

As in the first embodiment, compositions are composed and arranged by talented artists. The compositions are then recorded in professional studios where each part has at least two performances and may also have infinite multiple performances of each part. That is, the lead vocal track must have two or more different performances preferably by different artists. The same is true of the bass track, guitar track, drum track, etc. The performances are stored on single tracks that are synchronized to be exact to each other and then placed in a grid where they are interchangeable parts of a musical composition including the primary track.

The musical composition is mixed to industry standard where all of the multiple performances are synchronized by start, end, and length. The multiple performances thus have the capability to be substituted for each other. The multiple performance tracks are placed into an industry standard pre-master state like a 24-bit AIFF file, a 24-bit wave file or whatever the industry standard may become along with the primary track. The primary track along with the whole of all the multiple performances is then mastered to an industry standard of a glass master PMC, electronic master DDP, or other industry standard master.

With reference to FIG. 4, exemplary horizontal Track 1 contains five different fully recorded and mixed options for use selection. The options may be mixed using Pro Tools, Cake Walk or similar professional recording system then mix mastered in a high quality system. In this system, no compression of sound can take place after the performance interpretations of the same vocal part by five different singers as the tracks are synchronized to the same time length for each composition. The user can choose one vocalist, and in some cases the user can choose more than one to place in their final choice version for listening or burning to a file for play at the user's discretion. Track 2 does the same with the piano choices, Track 3 does the same thing with the didgeridoo choices, etc.

The primary track along with whole of the tracks which all contain multiple performances shall be rendered to a consumer state like MP3 or MP4 files for placement in the system where consumers will be able to select their performance mixes online or from a CD, DVD, or an analog or electronic storage unit from each of the multiple parts to create a file performance.

In some cases, it will be allowable for only one track to contain multiple performances of the same part, where other tracks may contain only one musical performance on a track. In this embodiment, the primary track is always included in to the mixed and mastered user files, which results in the unique sound and composition.

The owner of the music master may need to obtain the right to upload their composition into an online server or hardware to be prepared for user engagement.

In one configuration, the primary track may be composed of up to five primary tracks (see step S1 in FIG. 1). The first primary track may include the performances of a particular composition, e.g., audio tracks of Donald Harrison playing A440 on his alto saxophone and singing A440. A second primary track may be a version of the first primary track inverted to play backwards. A third primary track may be a version of the first primary track with the front half inverted and the back half played forward. A fourth primary track may be a version of the first primary track with the front half played forward and the second half inverted to play backwards. A fifth primary track will be devised after processing in a section of the program where software in selectable media can write a music track based off its impression of the first four primary tracks and all the performance tracks after they are synchronized together (see step S1A in FIG. 1). The result of the computer track will be placed as the fifth primary track. This method may include a process where the five primary tracks will be synchronized with the all the performance tracks in singularly for each composition to provide balanced musical axis for every composition in an audio or other media format.

The fifth primary track may be generated using a feature similar to OMax. OMax is a known software environment that learns in real-time typical features of a musician's style and plays along with the musician interactively, giving the flavor of a machine co-improvisation. OMax uses OpenMusic and Max. It is based on research on stylistic modeling and on principles of improvisation using a computer. In the present embodiment, instead of playing along with a musician, the system would write and record another track based on features and characteristics of the composition. That track would then become the fifth primary track.

Other programs may also be suitable for generating the fifth primary track as would be apparent to those of ordinary skill in the art. None of the existing programs, however, propose to record the music that is generated or mix them with other previously recorded multiple performance tracks. An examples of suitable program is Melomics, which is a proprietary computational system for the automatic (without human intervention) composition of music, based on bioinspired methods and produced by Melomics Media. Composing a wide variety of genres, all music composed by Melomics algorithms are available in MP3, MIDI, MusicXML, and PDF (of sheet music), after purchase. Ludwig is an automated composition software based on tree search algorithms. Ludwig generates melodies according to principles of classical music theory. The software arranges its melodies with pop-automation patterns or in four-part choral writing. Ludwig can react in real-time on an eight-bar theme played on a keyboard. The theme is analyzed for key, harmonic content and rhythm while it is being performed by a human. The program then without delay repeats the theme arranged e.g., for orchestra. It subsequently varies the melody to create a little piece as interactive answer to the human input. ChucK is a text-based, cross-platform language that allows real-time synthesis, composition, performance and analysis of music. The Impromptu media programming environment was developed for exploring 'intelligent' interactive music and visual systems. Impromptu is used for live coding performances and research including generative orchestral music and computational models of music perception.

The method may also include after processing the primary tracks, audio mixing all of the performances then rendering the five primary tracks and all the performance tracks into a pre-mastering state then mastering all of the performances and the five primary tracks as a composition. If a glass master or outside master is made then it must be put back in the system by a glass manufacturing facility or facility which has the technology for the type of master provided in the mastering process.

One method by which selectable media will function from a server includes via the Internet. In this method, an online server will house software that has been developed and programmed to upload the primary track(s) along with the mixed and mastered multiple performances of the same part tracks into a composition file. The user can access a composition file where the user can choose at least one performance from each of the single tracks, which contain multiple performances of the same part. After the user completes the selections, the selections are moved to a new file in the server area and then synchronized to be exactly the same length in a two track stereo, 5.1 file, or other consumer standard audio song file format. The user may now choose to preview a portion of the selected mix (e.g., 20 seconds). The preview will then be sent over the Internet as a two-track stereo, a 5.1 file, or other consumer standard audio song file format for playback by stereo speakers, cell phone, automobile audio system etc. After previewing the selected mix, the user may then choose to order a full-length version of the mix. The ordered mix will be become a new file and moved into a separate server area of the software and synchronized into a final format.

A second method for selectable media is a system employed via the Internet where the primary track(s) along with all the single tracks which contain multiple performances of the same part contained on their own track begin in a muted state. As the user selects performances, the mute switch is turned off on their selections, which will make the user selections audible. The primary track(s) along with all the selected un-muted performances are then moved to a new file in the server area and synchronized to a preview length. The user may now choose to preview the selected mix. Once selected by the user, the preview will then be sent over the Internet in a suitable file format for playback. After previewing the selected mix, the user may then choose to order a full-length version. The ordered mix will be become a new file in a separate server area in a suitable format for download and playback.

Figure 5:
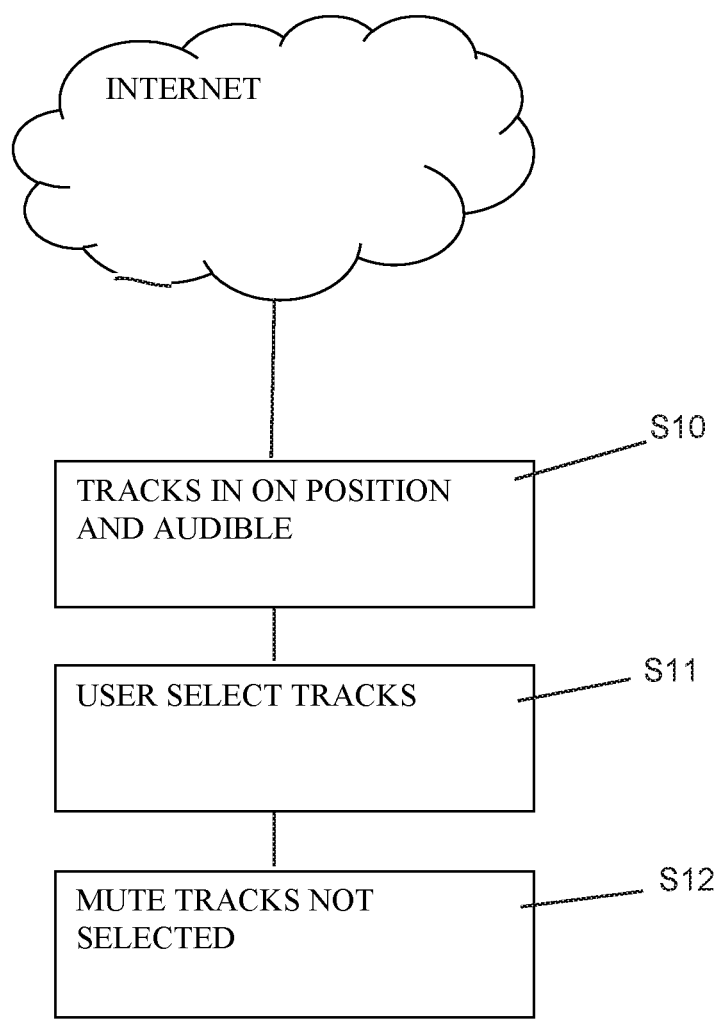

With reference to FIG. 5, a third method for selectable media is a system employed via the Internet where the primary track(s) along with all the single tracks which contain multiple performances of the same part contained on their own track begin in the ON position and are all audible (S10). After the user selects performances (S11), the performances not selected become muted, leaving only the user selections audible (S12). The primary track(s) along with all the audible single tracks which contain multiple performances of the same part contained on their own track become the user selected composition. After the user has made all of their selections, the mute switch will be turned ON for the performer selections not chosen. The primary track(s) along with all the user selected performances are then processed as described above.

As noted above, the system is applicable to any form of media including, without limitation, musical composition, written dialogue, film, etc., with or without sound for a preset number of musicians, vocalists, actors or other visual image mediums such as cartoons, computer generated images, and the like. The system enables a user to customize a particular composition by mixing and matching performers. The system provides unique control for an enhanced listening experience.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A method of customizing a media composition comprising:
    (a) providing a media file comprising selectable tracks, each track including a recording of a performer performing a part of a particular composition including a plurality of parts, wherein the selectable tracks include multiple performances of at least one of the plurality of parts by different performers;
    (b) providing a user an option to select one or more of the tracks such that tracks selected by the user are user selected tracks;
    (c) including a primary track of the particular composition in the media file;
    (d) preparing a customized media file including the user selected tracks and the primary track; and
    (e) enabling the user to repeat steps (a)-(d) with alternative user selected tracks if desired to prepare an alternative customized media file until the customized media file or the alternative customized media file is finalized, wherein the primary track forms part of the customized media file and each of the alternative customized media files,
    wherein the primary track and the selectable tracks of the particular composition are rendered by being synchronized with one another by start, end and length and mixed to industry standard pre-master state, and wherein the primary track and the selectable tracks of the particular composition are subsequently mastered, wherein the media file comprises a music file, wherein the primary track is a performance of at least one part in the particular composition by a particular artist, and wherein the primary track comprises five primary tracks including a first primary track including performances of two parts in the particular composition mixed into a single track, a second primary track including a version of the first primary track inverted to play backwards, a third primary track including a version of the first primary track with a front half inverted and a back half played forward, a fourth primary track including a version of the first primary track with the front half played forward and the second half inverted to play backwards, and a fifth primary track being devised based on a software interpretation of the first, second, third and fourth primary tracks and the user selected tracks after synchronization.

2. A method according to claim 1, wherein step (a) is practiced by providing each track with a recording of a performer playing an instrument or performing a vocal part of the particular composition.

3. A method according to claim 1, further comprising, after step (d), enabling the user to preview the customized media file, and providing the user with an option to repeat steps (b) and (d).

4. A method according to claim 1, further comprising storing the finalized customized media file in a format suitable for download, storage and playback.

5. A method according to claim 1, wherein step (b) is practiced by presenting the tracks for selection in a muted state, and unmuting the tracks as the muted state tracks are selected by the user.

6. A method according to claim 1, wherein step (b) is practiced by presenting the tracks for selection in an ON position where all of the tracks are audible, and muting any unselected tracks after an indication from the user that the user is finished making selections.

7. A method according to claim 1, wherein primary track along with the user selected tracks are mastered to an industry standard.

8. A method according to claim 1, further comprising, prior to step (a), recording the primary track and the selectable tracks.

9. A method according to claim 8, wherein the recording step is practiced by recording the primary track and the selectable tracks in audio isolation with no audio leakage from other tracks.

10. A method according to claim 1, wherein the primary track is a performance of at least one part in the particular composition by a particular artist, and wherein the particular artist is Donald Harrison.

11. A method according to claim 10, wherein the primary track includes performances of two parts in the particular composition mixed into a single track.

12. A method according to claim 10, wherein the primary track consists of a performance of an instrumental part by the particular artist and a vocal part by the particular artist.

13. A method of customizing a media composition comprising:
    (a) providing a media file comprising one or more selectable tracks, each track of the selectable tracks including a recording of a performer performing a part of a particular composition including a plurality of parts, wherein the selectable tracks include multiple performances of at least one of the plurality of parts by different performers;
    (b) providing a user an option to select one or more of the selectable tracks such that selectable tracks selected by the user are user selected tracks;
    (c) including a primary track in the media file; and (d) preparing a customized media file including the user selected tracks and the primary track, wherein the media file comprises a music file, wherein the primary track is a performance of at least one part in the particular composition by a particular artist, and wherein the primary track comprises five primary tracks including a first primary track including performances of two parts in the particular composition mixed into a single track, a second primary track including a version of the first primary track inverted to play backwards, a third primary track including a version of the first primary track with a front half inverted and a back half played forward, a fourth primary track including a version of the first primary track with the front half played forward and the second half inverted to play backwards, and a fifth primary track being devised based on a software interpretation of the first, second, third and fourth primary tracks and the user selected tracks after synchronization.

14. A method according to claim 13, further comprising, audio mixing the user selected tracks, rendering the five primary tracks and the user selected tracks into a pre-mastering state, then mastering the user selected tracks and the five primary tracks as the customized media file.

* * * * *